United States Patent [19]

Eastman

[11] 4,442,928

[45] Apr. 17, 1984

[54] ACTUATOR

[75] Inventor: James M. Eastman, South Bend, Ind.

[73] Assignee: The Bendix Corporation, Southfield, Mich.

[21] Appl. No.: 307,737

[22] Filed: Oct. 2, 1981

[51] Int. Cl.³ .................. B60K 41/20; F16D 71/00; F16D 7/02

[52] U.S. Cl. .................. 192/3 N; 192/141; 192/143; 464/47; 464/97

[58] Field of Search .................. 192/3 N, 141, 143; 251/134; 464/47, 97

[56] References Cited

U.S. PATENT DOCUMENTS

| | | | |
|---|---|---|---|
| 2,502,573 | 4/1950 | Lee | 192/141 X |
| 2,660,281 | 11/1953 | Ochtman | 192/141 |
| 2,820,600 | 1/1958 | Brunner | 464/97 X |
| 3,122,903 | 3/1964 | Ramsden | 464/48 |
| 3,258,985 | 7/1966 | Jordan | 251/134 X |
| 3,590,965 | 7/1971 | Oppenheimer | 192/3 N |

Primary Examiner—Allan D. Herrmann
Attorney, Agent, or Firm—Leo H. McCormick, Jr.; Ken C. Decker

[57] ABSTRACT

In an actuator system (10) having an air motor (12) for supplying a ball-screw actuator (14) with rotary input. The ball screw actuator (12) has a friction clutch mechanism (206) that limits the torque applied to the screw (176) when the ball nut (166) reaches first and second extreme positions. Thus, the maximum output from the air motor (12) can be applied to ball screw actuator (14) without braking before the positions are reached. A torsion bar and a cam 274 act to regulate the clutch (206) slipping torque to narrow limits, thereby easing strength requirements in the actuation mechanism (10).

17 Claims, 8 Drawing Figures

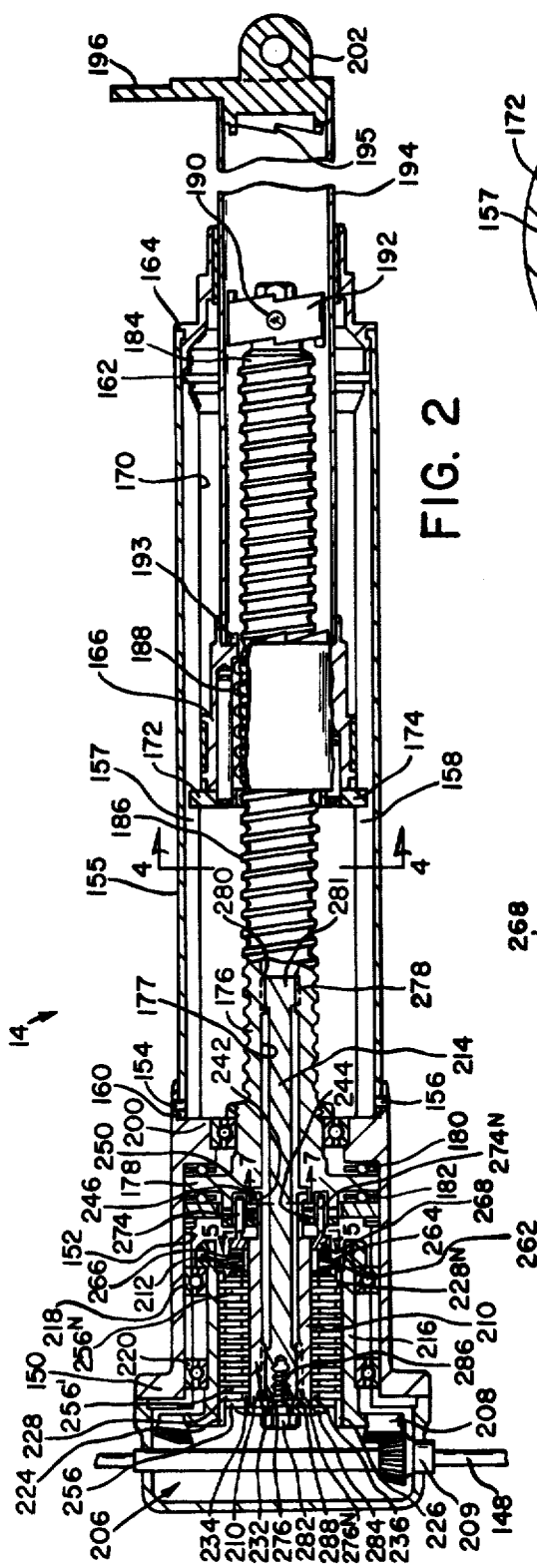
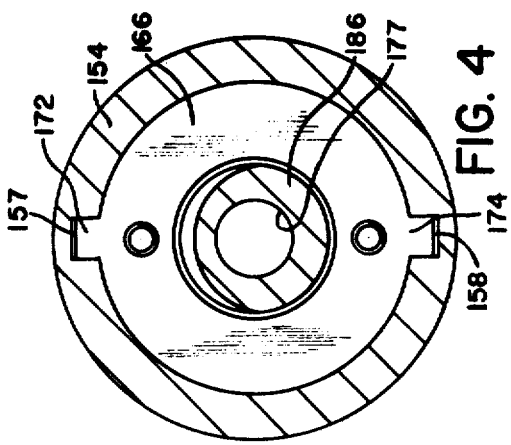
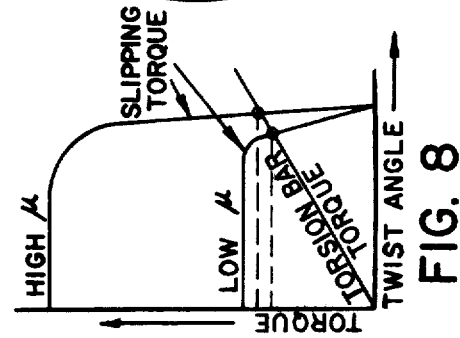
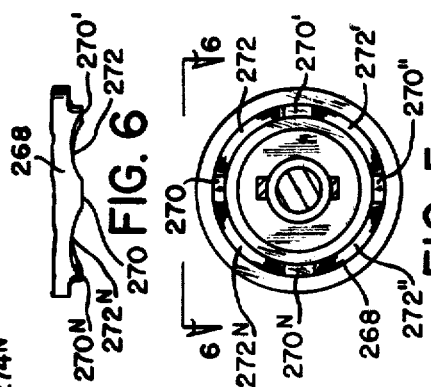
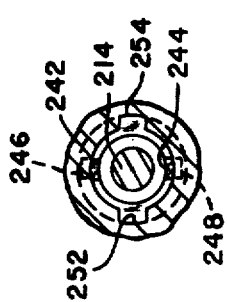

ACTUATOR

This invention relates to an actuator having a clutch mechanism to limit the torque applied to a driven member by a drive member when an output member reaches a fixed position.

In jet aircraft it is common practice to bleed air from the compressor to operate high speed air motors. The output from the air motors is transmitted through actuators to provide power for moving flaps, deploying and stowing thrust reverser mechanisms, etc.

The actuators for the thrust reversers are usually multiple parallel ball screw actuators which are normally either in an "in" or "out" position; i.e., at one end or the other of the stroke. While it is desirable to rapidly move the ball screw actuators between the "in" and "out" positions, it is necessary to reduce the speed of the air motor before travel stops are engaged to prevent overloading thereof. If unduly heavy structure is to be avoided, the speed of the air motor must be substantially reduced before the ball screws reach the end of their stroke going between the "in" and "out" positions. Because of variations in the pressure of the bleed air, flight speed, air motor blow-by losses, aerodynamic and friction loads, the control structure required to initiate and control the operation of the air motor and ball screw actuators can be quite complex.

In addition once the ball screw actuators reach the "in" or "out" position, it is necessary to lock the air motor in a fixed position by a spring loaded brake before the bleed air is shut off to assure that the ball screw is loaded against a travel stop. The ball screw actuator could be equipped with a simple spring loaded torque limiting slip clutch which would allow the air motor to drive the ball screw against the travel stop at full speed. Unfortunately with such structure, the slip torque can vary widely due to changes in effective friction coefficient with changes in temperature, surface wear pattern, rotational speed, etc. As a result, this type of structure can still allow excessive stop engaging loads, since the minimum slipping torque must exceed the maximum anticipated actuator driving torque requirement.

In the invention disclosed herein, an actuator has a housing with a bore therein. A shaft located in the bore has screw threads thereon that extend from a first position to a second position. A nut carried on the threads has a projection that is located in a slot in the bore to rotationally restrain the nut in the bore. An input member connected to the air motor provides a linkage member with rotary torque causing the shaft to rotate and move the nut in the bore to provide an output member with linear movement.

The linkage member is characterized as a drive member connected to the input member, a driven member connected to the shaft by a torsionally flexible member and an axially resilient member for urging the driven member into frictional engagement with the drive member. The torsionally flexible member transfers rotary motion from the driven member to the shaft until, at the linear travel limits of the nut, the shaft engages rotational stops carried by the nut. Thereafter, the twisting of the torsionally flexible member allows the driven member to move a cam and reduce the force of the axially resilient member to reduce the frictional engagement between the drive and driven members when a desired slip torque is reached. Thus, the ball can be driven against the stops without exceeding load torques which are set at a value only fractionally higher than the maximum output load for the actuator.

An advantage of the invention disclosed herein results from the protection provided each actuator by a torque limited slip clutch that permits the air motor to linearly move the ball screw against its stops at full speed without overloading or damaging components therein.

A further advantage of the invention results from affording this same overload protection in the event of thrust reverser jamming at mid stroke as a result of foreign object ingestion or defective mechanisms or adjustments.

A further advantage of the invention is the shorter actuation time which results when the air motor is not required to slow down before engaging actuator stops.

A further advantage occurs when multiple parallel actuators are driven by a single air motor, through the synchronization of their output members provided by the clutch mechanisms.

It is an object of this invention to provide a ball screw actuator with a limited torque clutch arrangement to prevent damage that could occur through the abrupt restraint of a rotary output from an air motor.

These and other advantages should be apparent from reading the following description and viewing the accompanying drawings in which:

FIG. 2 is a sectional view of a ball-screw mechanism of FIG. 1;

FIG. 4 is an enlarged sectional view taken along line 4—4 of FIG. 2;

FIG. 5 is an enlarged sectional view taken along line 5—5 of FIG. 2; and

FIG. 6 is an enlarged sectional view taken along line 6—6 of FIG. 5;

FIG. 7 is an enlarged sectional view taken along line 7—7 of FIG. 2;

FIG. 8 is a graph showing the relationship between the torque transmitted to an output member and the twist angle of a torsionally flexible member through which it is transmitted.

Figure 1:
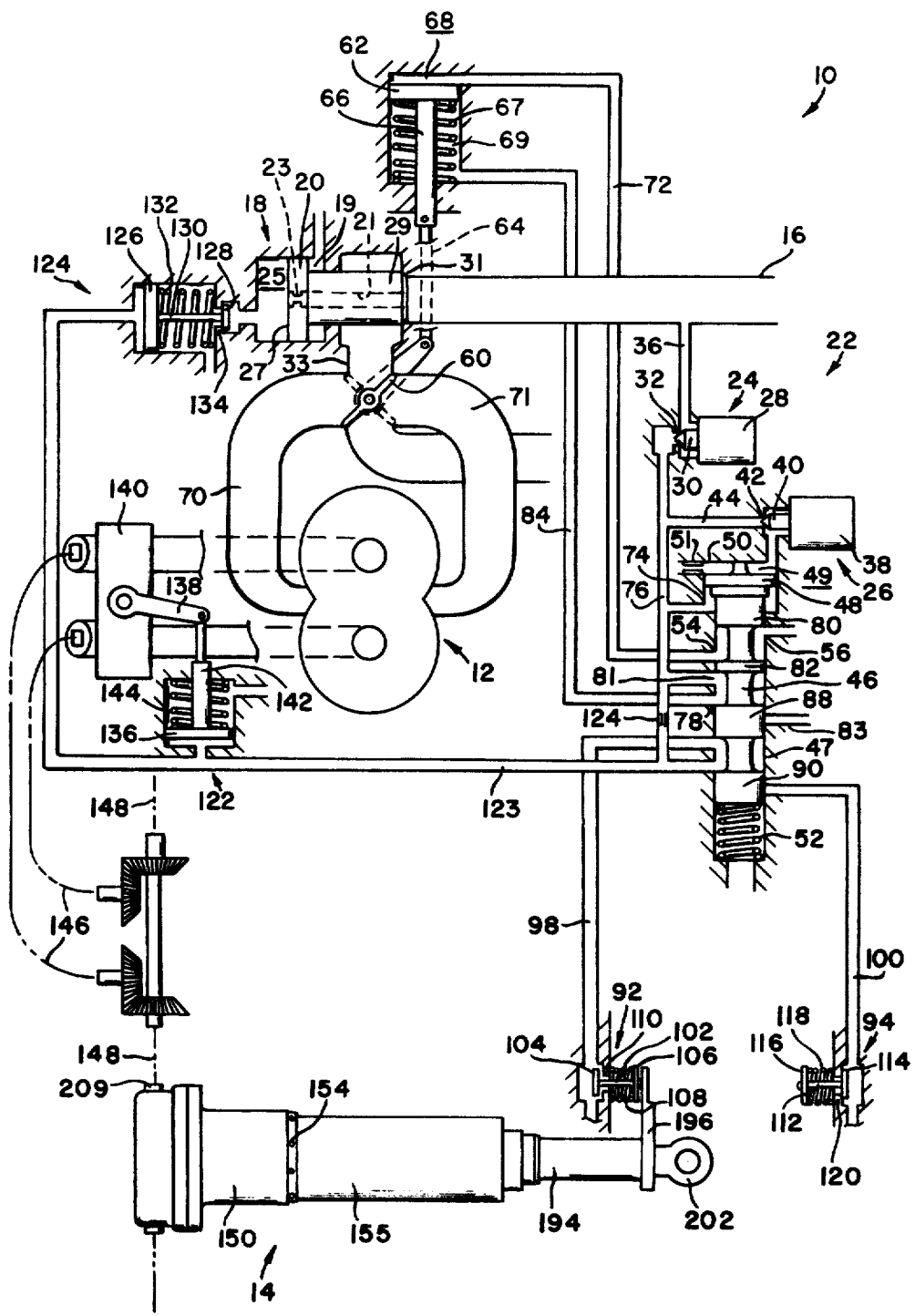
FIG. 1 is a schematic illustration of an actuator system having ball-screw mechanisms with limited torque clutch devices made according to the principles of this invention.

In the actuator system 10 shown in FIG. 1, an air motor 12 of the type disclosed in U.S. Pat. No. 4,276,006 filed Nov. 7, 1978 supplies multiple ball screw actuators 14, only one of which is shown, with an input to develop an output for operating a thrust reverser (not shown) in an aircraft.

With the jet engine in the aircraft operating, compressor pressure is available in conduit 16 to operate the air motor 12 in response to an operator. However, piston 20 in valve 18 prevents the flow of air into the air motor 12 until such time as the actuation valves 22 and 26 are provided with actuation request and either stow or deploy selection signals.

Piston 20 has a passage 21 with a restricted orifice 23 located therein to allow air from passage 16 to flow into chamber 25. The air under pressure in chamber 25 acts on face 27 to move face 29 against seat 31 to seal the air motor supply inlet 33 from the supply chamber 16.

Air motor 12 has a four way selector valve 60 that is connected to a piston 62 by linkage 64. A spring 67 acts on piston 62 to urge piston 62 toward chamber 68. In this position air from supply inlet 33 is directed through manifold 70 to operate the air motor 12 in the direction to stow the thrust reverser.

The actuation valves include an actuation request valve 22, a position selector pilot valve 26 and a position selector valve 46. Actuation request valve 24 has a solenoid 28 with a plunger 30 that is urged toward a seat 32 by a spring (not shown) to control the flow of air from supply conduit 16 through conduit 36.

The position selector pilot valve 26 has a solenoid 38 that controls the flow of air from conduit 76 through passage 44 into chamber 49 located in bore 74 and to the surrounding environment via restrictor 51. The solenoid 38 has a plunger 40 that is urged toward a seat 42 by a spring (also not shown) to seal passage 44 from chamber 49. The restrictor 51 vents chamber 49 to the surrounding environment to allow spring 52 to urge differential area piston 48 against wall 50 of chamber 49 and correspondingly vent chamber 68 to the surrounding environment by way of conduit 72, ports 54 and 56. Spring 67 then holds piston 68 upward and four-way valve 60 in the stow actuating position as shown.

Spool 46 has a land 80 that separates port 56 from port 74. Port 74 is connected to the supply conduit 36 by passage 76. When actuation valve 24 is open, supply pressure is communicated through port 76 and acts on the underside of differential area piston 48 to aid spring 52 in holding valve 46 in the upward stow position as shown. In this position valve 46 also communicates high pressure air to the underside of piston 62 via passage 76, ports 81 and 78, and passage 84, to aid spring 67 in holding piston 62 in the fixed stow position.

Spool 46 has leads 88 and 90 that cooperate to connect conduit 123 to either limit valve 92 or 94 through conduit 98 or 100, respectively. Conduit 123 is also vented to supply pressure in passage 76 via restrictor 124.

Stow limit valve 92 has a stem 102 with a valve member 104 on one end and a head 106 on the other end. A spring 108 acts on head 106 to urge valve 104 toward a seat 110 to control the flow of air from conduit 98. Similarly, deploy limit valve 94 has a stem 112 with a valve face member 114 on one end and a head 116 on the other end. A spring 118 acts on head 116 to urge valve face 114 toward seat 120 to control the flow of air from conduit 100.

The output member 202 of actuator 14 carries a projection 196 adapted to engage and open stow limit valve 92 at one end of the actuator stroke and deploy limit valve 94 at the other. Channel 98 also connects to parallel stow position limit valves (not shown) for each of the other actuators. Channel 100 similarly connects to deploy position limit valves for the other actuators.

Restriction 124 limits and controls the flow rate of air from the source to the limit valves 92 and 94, brake actuating cylinder 122 and valve actuating cylinder 124.

Cylinder 124 has a piston 126 connected to a valve member 128 by a stem 130. A spring 132 acts on piston 126 to urge member 128 into engagement with seat 134 to seal chamber 25 from the surrounding environment, and allow supply pressure from passage 16 to enter chamber 25 via restrictor 23 and hold valve 18 closed as shown.

The brake actuating cylinder 122 has a piston 136 connected to lever arm 138 on band or caliper brake member 140 by link 142. A spring 144 acts on piston 136 to move lever arm into a position where the transmission of rotary torque from air motor 12 through cables 146 and 148 is restrained. Cables 146 and 148 are connected to a series of ball screw actuators 14, only one of which is shown.

Figure 3:
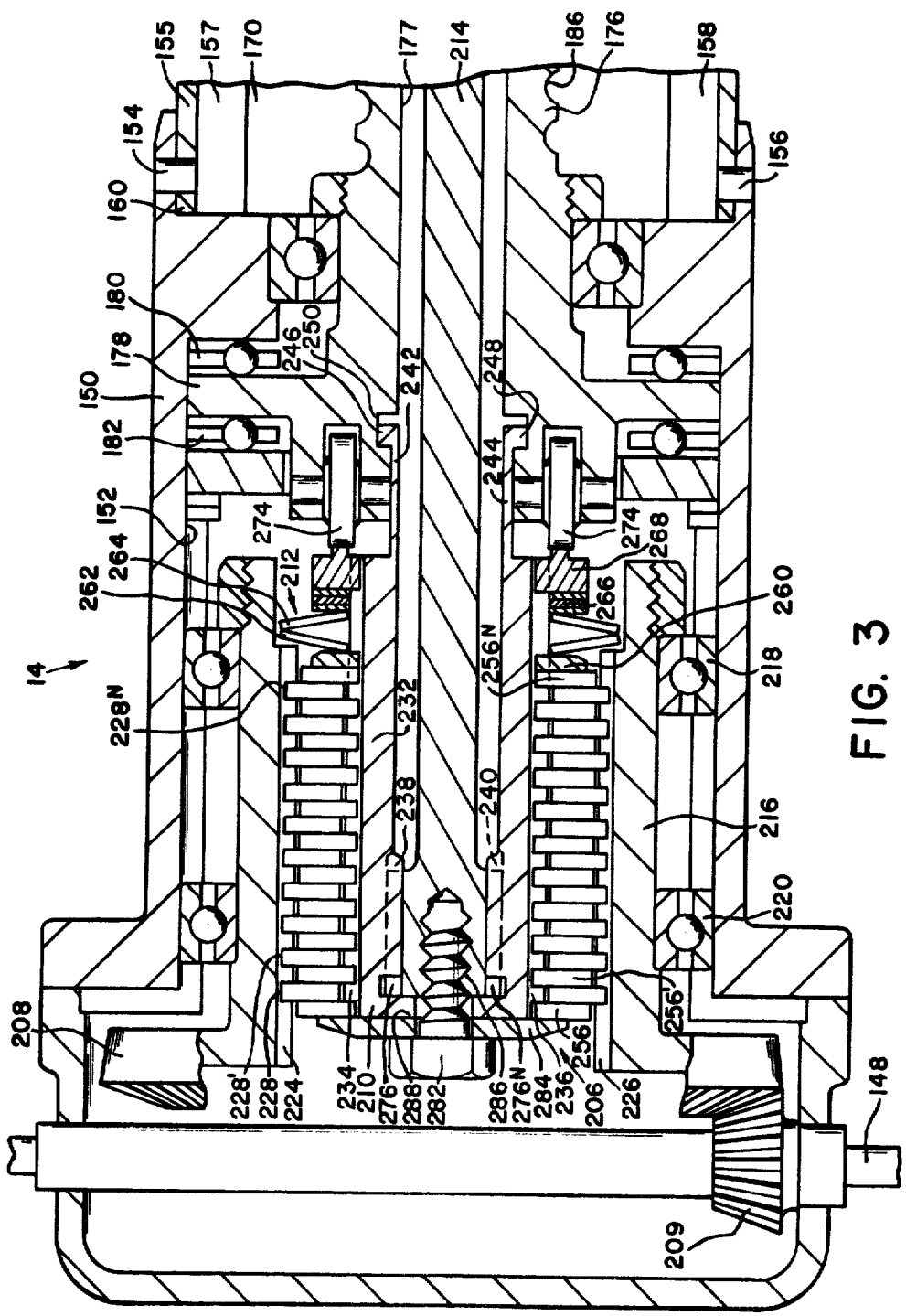
FIG. 3 is an enlarged sectional view taken from FIG. 2.

As best shown in FIGS. 2 and 3, each ball screw actuator 14 has a housing 150 with a bore 152 located therein. A cylinder 155 is attached to the housing 150 by a series of rivets 154 and 156 or by a weld. As shown in FIG. 4, cylinder 155 has slots 157 and 158 that extend from end 160 to a point 162 adjacent end 164 to restrain nut or ball nut 166 from rotating within bore 170 through the engagement to keys 172 and 174 within these slots. A shaft or screw 176 has a head 178 located between thrust bearings 180 and 182 and an end 184 that extends through cylinder 155. Threads 186 on shaft 176 engage corresponding threads 188 on nut or ball nut 166. Rotary movement of shaft 176 causes nut or ball nut 166 to move linearly with respect to cylinder 155. A toothed member 192 is attached to end 184 of shaft 176 by a pin 190 to coact with similar teeth 193 on nut or ball nut 166 or 195 on end 202 to provide a rotational shaft stop which limits the linear movement of nut or ball nut 166. A cylinder 194 attached to nut or ball nut 166 delivers the actuator output movement to end 202 which carries a projection 196 that engages limit valves 92 or 94 immediately before toothed member 192 engages stop teeth 193 or 195 at the ends of the actuator stroke.

The rotary torque from cables 146 and 148 is transferred to shaft 176 through clutch mechanism 206 located in housing 150.

Clutch mechanism 206 includes a drive member or gear 208 coacting with gear shaft 209 on cable 148, a driven member 210, and a torsion bar 214 that connects the driven member 210 with shaft 176.

The drive member or gear 208 has a cylindrical section 216 with bearings 218 and 220 located on its peripheral surface and a series of splines 224 and 226 located on its inner surface. A plurality of drive disc members 228, 228'–228$^N$ have a series of slots on their peripheral surfaces that are mated with splines 224 and 226.

The driven member 210 includes a cylindrical member 232 with a first series of axial splines 234, 236 along its entire peripheral surface and a second series of splines 238 and 240 along on its inner surface adjacent at one end and a pair of projections 242 and 244 extending from its other end. Projections 242 and 244 have ribs 246 and 248 that pass through slots 252 and 254 as shown in FIG. 7 and are finally located in groove 250. A plurality of rotor discs 256, 256'–256$^N$, each of which has a series of slots on its inner surface, are mated with splines 234 and 236 and are interspersed between the plurality of rotor discs 228, 228'–228$^N$. A pressure plate 260 having slots on its inner surface is mated with the splines 234 and 236 on cylindrical member 232 and engages the end rotor disc 256$^N$.

The axially resilient spring member 212 includes back-to-back (belleville) washers 262 and 264 or any other type spring whose rate is substantially uniform over its operating range. The axial force exerted by member 212 is established by shims 266 and cam member 268. Cam member 268 as best shown in FIGS. 5 and 6 has a series of flat surfaces 270, 270'–270$^N$ connected to each other by curved sections 272, 272'–272$^N$ and is constrained to rotate with driven member 232 by splines 234 and 236. Rollers 274, 274'–274$^N$, attached to projections on head 178 of shaft 176 engage cam member 268.

The torsion bar 214 has splines 276 on one end and splines 278 on its other end. Flats 270, 270'–270$^N$ are aligned with rollers 274, 274'-274$^N$. Thereafter torsion bar 214 is placed in bore 177 of shaft 176 and moved toward cylindrical member 232 until splines 276 engage splines 240 and splines 278 engage splines 280.

A screw 282 engages threads 286 in torsion bar 214 to bring the end of the torsion bar against shoulder 288 on cylindrical member 232. At the same time the head on screw 282 engages backing plate 284 causing discs 256-256$^N$ and 228-228$^N$ to move toward shaft head 178 since ribs 246 and 248 hold cylindrical member 232 in a relatively fixed axial position. As nut 282 is tightened, belleville washers 262 and 264 are compressed to develop a spring force that produces the frictional engagement between discs 228-228$^N$ and 256-256$^N$.

In a jet engine that is in operation, a supply of air under pressure is available in conduit 16. This air under pressure flows through passage 21 in piston 20 into chamber 25 to develop a pressure differential across piston 20 with the pressure in the surrounding environment found in chamber 19. Since the area of face 27 is greater than the area of cylinder 29, the pressure differential moves the end of cylinder 29 into engagement with seat 31 to prevent air from being communicated to air motor 12 through conduit 33.

Should actuation request solenoid 24 be activated, air from conduit 16 flows via conduit 36 into conduit 76, since the face of plunger 30 is moved off of seat 32. With spool valve 46 in the upward position and stow limit valve 92 opened as shown in FIG. 1, air flow past restriction 124 does not effect either brake 122 or pilot valve 124 and the air motor 12 remains in the inactive state. This is because selector pilot solenoid 26 is not energized, indicating that the stow position is requested, and the open position of stow limit valve 92 indicates the thrust reverser is already in the stowed position.

When the operator supplies selector pilot solenoid 26 with an operational signal (indicating deploy position selection) at the same time as a signal to actuation request solenoid 24, air under pressure from conduit 44 is supplied to chamber 49. The air under pressure in chamber 49 acts differential area piston 48 and selector valve spool 46 by overcoming spring 52 and the air pressure below piston 43 to communicate chamber 69 to the surrounding environment by way of conduit 84, port 78, bore 47, and port 83. At the same time, air under pressure is communicated to chamber 68 by way of passage 81, bore 47, port 54 and conduit 72. The air under pressure in chamber 68 acts on piston 62 to overcome spring 67 and move 4-way valve 60 via linkage 64 to direct air into deploy direction manifold 71 instead of stow direction manifold 70 for air motor 12.

When spool 46 moves, land 88 closes flow communication from bleed 124 via bore 47 to conduit 98 going to limit valve 92, and communicates instead with limit valve 94 which is closed as shown. Thus the air under pressure in conduit 36 is communicated to both brake actuating cylinder 122 and pilot valve 124. This air under pressure acts on piston 136 to overcome spring 144 and move lever 138 to release brake 140 and acts on piston 126 to overcome spring 132 to move valve face 128 away from seat 134. With face 128 away from or off seat 134, chamber 25 is vented to the surrounding environment. Thereafter, the air under pressure in conduit 16, acts on valve face 29 and moves piston 20 to allow air to flow to air motor 12 via manifold 71.

With air flowing to air motor 12, a rotary output is provided to cable 146 and 148.

The rotary output from cable 148 causes gear 209 to drive gear 208 in the ball screw actuator 14.

Rotation of gear 208 moves rotor discs 228 which in turn engage rotor discs 256 to rotate driven cylindrical member 232. The rotation of cylindrical member 232 is transmitted into torsion bar 214 which in turn rotates screw 176. Since ball nut or nut 166 is restrained from rotating in bore 170, the rotary motion of screw 176 causes the ball nut or nut 166 to move linearly within cylinder 155. During the linear movement of ball nut or nut 166 head 178 rotates at the same angular velocity as rotor discs 256 and sleeve 232.

The full rotary output of the air motor 12 is transmitted through cables 146 and 148 driving the thrust reverser in the deploy direction via actuator output member 202 until projection 196 engages head 116 on deploy limit valve 94 to move valve face 114 away from seat 120 and open conduit 100 to the surrounding environment.

With the conduit 100 opened, the air under pressure downstream from restriction 124 is vented to the surrounding environment to reduce the pressure differential acting on pistons 126 and 136. At some reduction in the pressure differential, spring 144 acts on piston 136 to move arm 138 and initate braking of air motor 12. At a somewhat greater reduction in pressure differential, spring 132 acts on piston 126 to move valve face 128 against seat 134 and allow the pressure in chamber 25 to build up. As the pressure in chamber 25 builds up, a pressure differential develops across piston 20 that moves valve face 29 into engagement with seat 31 to terminate air flow to air motor 12.

When projection 196 engages head 116, the rotary output of the air motor 12 is at its full speed and its kinetic energy must be dissipated in the clutch mechanism 206 of the ball screw actuator 14 without damaging either the clutch mechanism 206 or ball-screw actuator 14.

When projection 196 has moved the limit valve 94 to the fully opened position, rotary stop 192 on the end of screw 176 will have engaged co-acting deploy limit rotary stop teeth 193 on nut 166. Since ball nut or nut 166 is restrained in bore 170 through the engagement of tabs 172 and 174 in slots or grooves 157 and 158, this will terminate the rotation of screw 176 and the linear movement of nut 166. End 281 of torsion bar 214 is then held in a stationary or fixed position. Since inertia adds to pneumatic power from air motor 12, the high torque from cylindrical member 232 causes the torsion bar to flex or twist through an angle which allows cylindrical member 232 to rotate through a correspondingly similar angle independent of the now stationary head 178 of screw 176. With this angular rotation, rollers 274-274$^N$ move off flats 270, 270'-270$^N$ and down ramp 272, 272'-272$^N$ to allow springs 262 and 264 to expand and proportionally reduce the frictional engaging force between discs 228, 228'-228$^N$ and 256, 256'-256$^N$. Thereafter, discs 228, 228'-228$^N$ continue to rotate with a slipping torque determined by the reduced frictional engagement force.

As the output of air motor 12 is reduced, inertia is dissipated, the rotary torque transmitted through cables 146 and 148 reduces, and the frictional engagement force between discs 228, 228'-228$^N$ and discs 256, 256'-256$^N$ stops the slippage and arrests further rotation of cylindrical member 216. Subsequent continued reduction in the torque of air motor 12 reduces the twist in torsion bar 214, and causes cylindrical member 232 to rotate through a corresponding angle such that rollers 274, 274'-274$^N$ move part way back up the ramp surface 272.

The load of spring 144 on piston 136 for brake 140 is selected in relation to the load of spring 132 on piston 126 for air motor supply pressure shut-off pilot valve 125 such that brake engagement is initiated before air motor supply pressure is significantly reduced, as the pressure downstream of restrictor 124 decays following opening of deploy limit valve 94. Consequently, when supply pressure reduction reduces motor torque sufficiently, brake 140 clamps air motor 12 with a selected minimum holding torque. This remaining torque, acting through drive cables 146 and 148, clutch mechanism 206, and torsion bar 214, holds rotational stop member 192 tightly against stop teeth 193 in nut or ball nut 166, thereby holding actuator output member 202 firmly in the deploy position. The signal to the actuation request solenoid 28 and the selector solenoid 38 would then normally terminate. Closure of actuation request pilot valve 22 would cut off air pressure to selector valve 46 as well as its pilot valve 26. Springs 52 and 67 would return the selector valve 46 and the 4-way valve control piston 62 to as shown in FIG. 1.

When ultimately the air motor is reversed to move the thrust reverser to the stow position, release of brake 140 and reverse torque will rotate cylindrical member 232 such that rollers 274, 274'-274" continue back up ramp surface 272, 272'-272$^N$ and arrive back on flats 270, 270'-270$^N$.

Since the slipping torque must always exceed the highest required driving torque and must be less than the minimum torsional strength of the driving mechanism, having a small range of values between maximum and minimum slipping torque reduces torsional strength requirements with corresponding benefit to actuator design in size, weight, and/or cost.

In order to control the torque at which the rotors 228, 228'-228$^N$ and 256, 256'-256$^N$ slip, the frictional engagement force may be adjusted by either adding or subtracting shims 266. Thus, the torque required to be absorbed by the ball screw actuator 14, as the air motor 12 slows from full actuation speed to a stop varies as illustrated by the graph in FIG. 8.

For a given frictional engagement force, the slipping torque is determined by the friction coefficient $\mu$. Even with the best materials and manufacturing techniques this can vary several fold depending on material and finish tolerances, wear patterns, temperature, humidity, etc. as illustrated by the horizontal segments of the slip curves in FIG. 8. The rapid reduction in frictional engagement force when twisting of torsion bar 214 causes rollers 274, 274'-274$^N$ to start down slopes 270, 270'-270$^N$ makes the slip curves drop sharply and reach zero torque simultaneously when springs 262 and 264 become completely unloaded. As higher torque increases the twist angle, slipping limits the torque attained to the value corresponding to the intersection of torsion bar and slipping torque curves. As shown by the broken lines, a several fold change in friction coefficient $\mu$ results in relatively small variations in actual clutch slipping torque.

If the solenoid 28 is energized, actuation request valve 22 opens and air under pressure in conduit 36 bleeds through restriction 124 and develops a pressure differential across pistons 126 and 136 in the pilot valve 124 and brake actuating cylinder 122, respectively. As the pressure differential increases, first spring 132 and then 144 are overcome to first vent chamber 25 to the surrounding environment and then release brake 140.

With chamber 25 vented to the surrounding environment, the air under pressure in conduit 16 moves piston 20 toward chamber 25 to allow air to flow to the air motor 12 which provides cables 146 and 148 with a rotary output driving the actuator in the stow direction. Air pressure supplied to conduit 84 from conduit 76 via selector valve 46 supplements the load of spring 67 holding 4-way control valve piston 62 in the stow position shown in FIG. 1.

This rotary output is transmitted through the clutch mechanism 206 to rotate screw 176 and linearly move nut or ball nut 166 within cylinder 155, thereby moving actuator output member 202 in the stow direction. When projection 196 engages head 106 on limit valve 92, conduit 98 is vented to the surrounding environment.

With valve face 104 off seat 110, as shown in FIG. 1, the pressure differential across pistons 126 and 136 is dissipated. As it decays, spring 144 moves piston 136 to initiate braking of the rotation of cables 146 and 148 and spring 132 moves piston 126 to urge head 128 against seat 134 to initiate the pressure build-up in chamber 25.

At some fluid pressure in chamber 25, a force developed by the fluid pressure acting on face 27 is sufficient to move piston 20 and urge face 29 against seat 31 to terminate the flow of air from conduit 16 to air motor 12.

When projection 196 engages head 106, toothed member 192 is approaching rotary stop teeth 195 on output end 202 and engages stop teeth 195 when face 104 is off seat 110 as shown in FIG. 1. Since it takes time for the air motor to shut off, the rotary torque from the air motor 12 as well as inertial torque continues to be applied to each ball screw actuator 14 during the shut down time period. Since end 281 of the torsion bar 214 is held stationary, the rotary torque twists the torsion bar 214 to rotate cylindrical member 232 and allow cam member 268 to move flat surfaces 270, 270'-270$^N$ with respect to rollers 274, 274'-274$^N$ and bring ramps 272, 272'-272$^N$, as shown in FIG. 6 into engagement with rollers 274, 274'-274$^N$. With rollers 274, 274'-274$^N$ on ramps, springs 262 and 264 expand to reduce the frictional engagement and allow slippage between discs 228, 228'-228$^N$ and 256, 256'-256$^N$. Since discs 228, 228'-228$^N$ are allowed to slip with respect to discs 256, 256'-256$^N$, the torque applied to the ball screw actuator 14 is limited by the torsional spring rate of the torsion bar 214 and the twist angle required to initiate slipping.

As the torque output from the air motor 12 is reduced, the slippage between discs 228, 228'-228$^N$ and 256, 256'-256$^N$ stops. Brake 122 clamps motor 12 when drive torque falls to a lesser torque, and the actuator output is firmly positioned in the stow position by this torque acting through drive cables 146, clutch 106, and torsion bar 214.

Cessation of the actuation request signal to solenoid 28 then closes valve 22 with no effect on the actuator and all valves and pistons remain as shown in FIG. 1. Although not shown as a part of the actuator, clearly limit switches could be coupled with the pilot's actuation switch to arrest actuation signals at the end of each stroke.

Thus, this invention allows the output of an air motor 12 to be applied to a ball screw actuator 14 for rapidly moving a device between first and second positions without braking the air motor 12 before the device reaches either of these positions.

I claim:

1. In an actuator having a housing with a bore therein, a shaft located in said bore, a nut carried on said shaft and rotationally restrained in said bore, an input member, an output member connected to said nut, and a linkage member for connecting said input member to said shaft, said linkage member transmitting a rotary torque from the input member to said shaft causing said nut to move in said bore and provide said output member with linear movement, said linkage being characterized by a drive member connected to said input member, a driven member connected to said shaft by a torsionally flexible member and an axially resilient member for urging said driven member into engagement with said drive member, said torsionally flexible member transferring a rotary torque from said driven member into said shaft until rotary movement of said nut is restrained, said rotary torque thereafter rotating said driven member to reduce the force of the axially resilient member and allow the drive member to rotate independent of said driven member.

2. In the actuator as recited in claim 1 wherein said drive member includes:
   a first cylindrical member having teeth on one end thereof that engage said input member, said cylindrical member having a series of splines along its inner surface; and
   first disc members having peripheral surfaces with a series of slots mated with said series of splines and inner surfaces, said first disc members engaging said drive member to provide said driven member with rotary torque.

3. In the actuator as recited in claim 2, wherein said driven member includes:
   a second cylindrical member having a series of splines on its outer surface and inner surface; and
   second disc members having a series of slots on their inner surfaces mated with the series of splines on the outer surface of said second cylindrical member, said first and second disc members being stacked alternately such that force from said axially resilient member generates friction at the multiple surfaces therebetween.

4. In the actuator as recited in claim 3 wherein said torsionally flexible member includes:
   a bar having a first end secured to the splines on the inner surface of said second cylindrical member and a second end secured to said shaft, said bar having a cross sectional area that permits relative angular elastic rotation of said first end when said second end is held stationary.

5. In the actuator as recited in claim 4 wherein said axially resilient member includes:
   a sleeve member having a series of slots on its inner surface mated with the series of splines on the outer surface of said second cylindrical member; and
   a spring for urging said sleeve toward said second disc members to establish said frictional engagement.

6. In the actuator as recited in claim 5 wherein said sleeve member further includes:
   a ring with a cam surface that engage said shaft, said angular rotation of said bar allowing the second cylindrical member to rotate through the same angular rotation and move the cam surface with respect to said shaft, said movement of the cam surface allowing said spring to expand and thereby correspondingly reduce the frictional engaging force between said first and second discs.

7. In the actuator as recited in claim 6 wherein said shaft includes:
   rollers that engage the cam surface to reduce the development of any drag force that may occur during the independent annular rotation of said second cylindrical member with respect to said shaft.

8. In the actuator as recited in claim 7 wherein said second cylindrical member includes:
   a plurality of projections that extend from a first end of the second cylindrical member, each of said projections having a flange on the end thereof, said flange being located in a groove in said shaft for joining the second cylindrical member to said shaft, said bar being splined to both said shaft and second cylindrical member to align said rollers on flats on said cam surface; and
   a fastener secured to said bar for supporting said first and second discs under the load from said spring to establish the initial frictional engagement therebetween.

9. In the actuator as recited in claim 8 wherein said spring includes:
   shims located between said ring and sleeve to adjust the compression of said spring and establish the initial friction engagement force between said first and second rotors.

10. In an actuator system having a source of fluid under pressure, a motor responsive to said fluid pressure for developing a rotary torque, a transmission mechanism for transferring said rotary torque to drive a screw mechanism and move a nut between first and second positions and supply a device with an operational output, a valve responsive to an operational signal for allowing fluid from the source to flow to said motor and develop said rotary torque, and limiter valve means responsive to movement of said device to initiate termination of the communication of fluid from said source, and a brake for locking said motor when fluid from said source is terminated, the improvement in the transmission mechanism comprising:
    a drive member connected to said transmission mechanism;
    a driven member;
    a resilient member for urging said driven member into frictional engagement with said drive member; and
    a flexible torsional member connected to said driven member for transferring rotary torque to said screw mechanism from said driven member, said screw mechanism being rotationally restrained when said nut reaches said first and second positions, said flexible torsional member responding to the increased rotary torque during restraint of said screw mechanism by rotating said driven member with respect to said screw to reduce the axial urging force of said resilient member and permitting said drive member to rotate independent of said driven member to prevent inertial damage to said nut and said screw mechanism by an abrupt stop at said first and second positions.

11. In the actuator system, as recited in claim 10 wherein said drive member includes:
    a first cylindrical member having series of axial splines located on its inner surface;

a plurality of first disc members having a series of slots mated with said series of axial splines on said first cylindrical member, said first disc members engaging said driven member to transfer said rotary torque to said flexible torsional member.

12. In the actuator system, as recited in claim 11 wherein said driven member includes:
 a second cylindrical member having a first end abutting said screw mechanism to axially restrain the driven member with respect to said screw mechanism and a second end, said second cylindrical member having a series of axial splines on its outer surface; and
 a plurality of second disc members having a series of slots mated with said axial splines on said second cylindrical member, said resilient member urging said first and second disc members toward each other to create said frictional engagment therebetween.

13. In the actuator system, as recited in claim 12 wherein said resilient member includes:
 a pressure plate having slots thereon mated with the splines on said second cylindrical member, said pressure plate having a cam surface thereon that engages a raised surface on said screw mechanism; and
 a spring for urging said pressure plate toward said second discs, said rotation of the flexible torsional member moving said cam with respect to said raised surface on said screw mechanism to allow said spring to expand and correspondingly reduce the frictional engagement between said first and second plurality of discs.

14. In the actuator system, as recited in claim 13 wherein said raised surface on said screw mechanism includes:
 rollers that engage flats on said cam until said rotation takes place in said flexible torsional member and thereafter engage a uniform sloping surface to proportionally allow said spring to expand as a function of the rotation in said flexible torsional member to correspondingly reduce the frictional engagement of said plurality of first and second discs and thereby limit the rotational torque applied to said ball and screw mechanism.

15. In a motor driven two position rotary actuator a control means comprising:
 stop means for limiting the angular stroke of the actuator;
 friction means for establishing a slip torque;
 elastic means for exerting a force on said friction means to determine the magnitude of the slip torque;
 flexible torsional means responsive to said clutch output torque;
 cam means operated by said flexible torsional means to increase the length of said elastic means when output torque increases above a predetermined level to rapidly lower the force on said friction means and initiate slipping at a substantially predetermined torque to allow the motor to over run after engaging said stop means to limit the torque developed by motor inertia and absorb its kinetic energy;
 shut off means for turning off the motor power when said stop means is engaged; and
 brake means for locking the motor in a fixed position when power is turned off and rotation has stopped.

16. An actuator, as in claim 15, wherein said control means includes:
 means to adjust the slip torque.

17. An actuator, as in claim 16, where in said means to adjust includes:
 shims of various dimensions that engage said elastic means to change the force acting on said friction means.

* * * * *